May 26, 1970   HORST-GÜNTER EISHOLD ET AL   3,513,635
GROUND FOR ELECTROSTATIC DUST COLLECTOR ELECTRODE
Filed Oct. 23, 1968
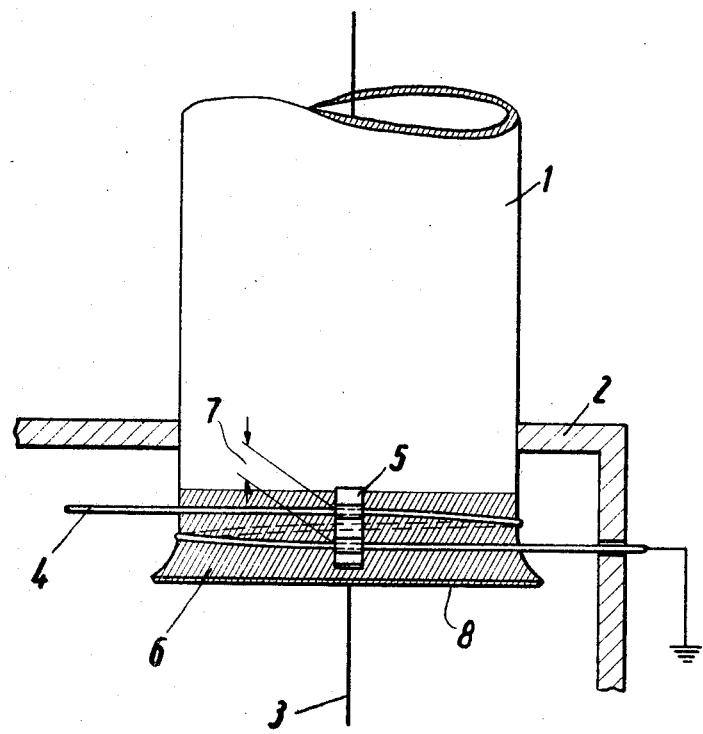
Inventors
Horst-Gunter Eishold
Walter Steuernagel United States Patent Office 3,513,635
Patented May 26, 1970

3,513,635
GROUND FOR ELECTROSTATIC DUST
COLLECTOR ELECTRODE
Horst-Günter Eishold and Walter Steuernagel, Frankfurt am Main, Germany, assignors to Metallgesellschaft Aktiengesellschaft, Frankfurt am Main, Germany
Filed Oct. 23, 1968, Ser. No. 770,033
Int. Cl. B03c 3/49, 3/53
U.S. Cl. 55—155   5 Claims

ABSTRACT OF THE DISCLOSURE

A pipe-type collecting electrode composed of non-conductive material in a wet-working electrostatic dust collector is grounded by means of an electrically conducting coating on one end of the electrode and an electrically conducting strand looped around the coating. The windings of the strand are separated by spacers composed of non-conducting material.

---

It is known that in electrostatic dust collectors using collecting electrodes of non-conductive material special ground conductors are used, which as for instance disclosed in French Pat. No. 1,334,663, are made by covering the electrodes with a continuous film of water and dipping the electrodes in a water channel which latter assumes the grounding by means of graphite rods, of liquid soaked cords of glass fibers or of ceramic material as well as of metal wires. When highly corrosive gases have to be cleaned or when acid mists have to be collected, in general, metallic ground conductors are not applicable or platimum wires, and in special cases, wires of lead or of titanium have to be used.

The trouble to get, for instance, the collecting pipes of pipe-type wet-working electrostatic dust collectors dipped in a ground liquid is substantial because the floors underneath the collecting pipes require a special design. To avoid this disadvantage, the film of liquid dripping from the inside walls of the collecting pipes was used for the grounding or for the partial substitution of the grounding.

But due to the discontinuity of such liquid film on the inside walls of the individual pipes, grounding difficulties occurred for a great number of pipes of wet-working pipe-type electrostatic dust collectors. Therefore, it was proposed to wind around the ends of the collecting pipes grounding wires or wet grounding cords and to assure connection with the moisture on the inner sides of the pipes which, however, in practice could only be attained by dipping to a certain degree the individual pipe into the grounding liquid. Also, this method is illustrated in detail in the above-mentioned French patent. In the latter method, it is unavoidable that the ground conductors touch at points which are not submerged in the ground liquid. When operating such pipe-type wet-working electrostatic dust collectors, high frequency currents often occur which destroy the contact points of the ground conductors.

The object of this invention is to eliminate quite a number of the described disadvantages for the grounding of collecting pipes of wet-working pipe-type electrostatic duct collectors.

In general, this object is obtained by an arrangement for a corrosion resistant grounding for collecting electrode pipes of non-conductive material in electrostatic wet-working pipe-type dust collectors by completely winding around the ends of the collecting pipes metal wires or moist cords of glass fibers or of ceramic material or of asbestos where the outside of the lower part of each collecting pipe has been made conductive by means of a coat of conductive material, and at which a loop of a grounding conductor is wound around this lower pipe end and at which at ordinary collecting voltages of 50 to 80 kv. the windings of the loop are kept at a distance from each other of more than 12 mm. by means of non-conductive spacers or distance pieces. In this invention, the outside of the lower pipe end beginning at the dripping rim up to the zone where the ground loop surrounds the pipe and including this zone can be covered with a graphite coat.

The advantages of this device are obvious as a dipping of the collecting pipes into a grounding liquid is avoided and nevertheless a destruction of the ground conductor by high frequency currents is eliminated.

The means by which the object of this invention is obtained are described more fully with reference to the accompanying drawing.

The drawing shows schematically in a partly cut side elevational view the lower part of a collecting pipe 1 of an electrostatic wet-working dust collector, the pipe being held by header 2. The discharge or spark electrode 3 extends through pipe 1.

The ground conductor strand 4 surrounds the lower part of the end of the pipe in form of a loop, the windings of which being kept apart by the distance piece 5 of non-conductive material in a distance 7 of at least 12 mm. The ground conductor can be made of metal wires as, for instance, of lead wire, titanium wire or under certain conditions of platinum wire depending upon the gases to be cleaned, or the ground conductor can consist of wettable cords of glass fiber, ceramic or of asbestos. The distance piece 5 is composed of a synthetic plastic material. The conductive coating 6 on the outside of the lower pipe end within the range of the loop of the ground conductor has been hatched for better illustration. The conductive coating begins at the lower dripping rim 8, but it can also be continued on the inside of the pipe. This coating can consist of graphite, of metal spraying, of a conductive lacquer or the like.

Having now described the means by which the objects of this invention are obtained, we claim:

1. In an electrostatic dust collector comprising a wet-working pipe-type collecting electrode composed of non-conductive material, and an electrical ground for said electrode comprising an electrically conducting coating on one end of said electrode, an electrically conducting strand (4) looped around said electrode and lying on said coating, a non-conductive distance piece separating the windings of the looped strand a distance depending upon the collector operating voltage, and said strand being grounded.

2. In a collector as in claim 1, said operating voltage being from about 50 to 80 kv., and said windings being separated a distance of at least 12 mm.

3. In a collector as in claim 2, said electrode having a dripping rim, and said coating covering said dripping rim.

4. In a collector as in claim 3, said coating being extended into the inside of said electrode.

5. In a collector as in claim 4, said coating comprising graphite.

References Cited
UNITED STATES PATENTS

| | | | |
|---|---|---|---|
| 2,055,368 | 9/1936 | Shively | 55—7 X |
| 2,231,330 | 12/1941 | Gove | 55—101 X |
| 2,937,709 | 5/1960 | De Seversky | 261—112 X |
| 3,248,857 | 5/1966 | Weindel et al. | 55—118 |

FOREIGN PATENTS

| | | |
|---|---|---|
| 807,124 | 1/1959 | Great Britain. |
| 828,282 | 2/1960 | Great Britain. |

DENNIS E. TALBERT, Jr., Primary Examiner

U.S. Cl. X.R.

55—157, 117